United States Patent Office

3,795,662
Patented Mar. 5, 1974

3,795,662
PROCESS FOR THE POLYMERIZATION
OF α-OLEFINS
Manfred Engelmann, Augsburg, Wolfgang Gordon, Hofheim, Taunus, and Kurt Rust, Frankfurt am Main, Germany, assignors to Farbwerke Hoechst Aktiengesellschaft vormals Meister Lucius & Bruning, Frankfurt am Main, Germany
No Drawing. Filed Sept. 22, 1972, Ser. No. 291,388
Claims priority, application Germany, Sept. 24, 1971, P 21 47 654.0
Int. Cl. C08f 1/56, 3/10
U.S. Cl. 260—878 B     12 Claims

ABSTRACT OF THE DISCLOSURE

The invention relates to a process for the polymerization of α-olefins, for the copolymerization or block copolymerization of these olefins among each other, with or without ethylene, in the presence of a catalyst system consisting of a solid titanium-containing reaction product obtained by the reaction of $TiCl_4$ with $Al(C_2H_5)_2Cl$ or $Al_2(C_2H_5)_3Cl_3$, the preliminary treatment with a further amount of $Al(C_2H_5)_2Cl$ and the subsequent treatment with alkali chloride in the absence of the monomer(s), and of a further amount of $Al(C_2H_5)_2Cl$ as activator.

The process makes it possible to prepare polyolefins having a particularly low atactic proportion, in a high space-time yield.

---

The present invention relates to a process for the polymerization of α-olefins.

It has been known to polymerize α-olefins and diolefins, in particular ethylene, propylene and butene-1, as well as butadiene and isoprene, with catalysts prepared from compounds of the elements of sub-Groups IV to VIII of the Periodic Table and compounds of main Groups I to III of the Periodic Table, the latter compounds having a reducing or alkylating effect, at a relatively low pressure and temperature, to give polyolefins having a high molecular weight. For these low pressure polymerization proceses, catalyst mixtures prepared from titanium tetrachloride or titanium subhalides together with organo-aluminium compounds have proved to be particularly useful. The catalysts used in these low pressure polymerization processes are termed "Ziegler catalysts" and have been described, for example, in British Pat. No. 799,392.

In the course of the polymerization of the propylene and the higher α-olefins by means of the above-mentioned catalysts, there are obtained, besides the highly crystalline polymers which are insoluble or difficultly soluble in the hydrocarbons used as dispersion media under the polymerization conditions, also amorphous and easily soluble polymers and oils. According to Natta, the highly crystalline polymers are sterically arranged and are termed "isotactic," whereas the soluble polymers are sterically disordered and are termed "atactic."

For the field of plastics, the largely crystalline isotactic polypropylene is particularly interesting. The formation of isotactic or amorphous poly-α-olefins is controlled by means of the catalyst system. For a suitable process from the economical point of view, catalyst systems having a selective effect are required, which help to form exclusively or almost exclusively the desired polymers. According to Natta, a selectively efficient catalyst system for the preparation of isotactic poly-α-olefins, in particular polypropylene, is obtained, for example, by using $TiCl_3$ and triethyl-aluminium, if the $TiCl_3$ has been prepared on the basis of $TiCl_4$ and $H_2$ at high temperatures [Natta and co-workers, Gazz. Chim. Ital., 87, Fasc. V 528, 549, 570 (1957)]. In the course of the reduction of $TiCl_4$ with $H_2$ at high temperatures, which is difficult to perform, a coarsely crystalline $TiCl_3$ is obtained. This product has then to be comminuted by a grinding process, in which the presence of undesired, extremely fine-crystalline $TiCl_3$ cannot be avoided. The same is true for the preparation of $TiCl_3$ from $TiCl_4$ and Al at elevated temperatures. Besides, only a relatively low polymerization rate is obtained by means of $TiCl_3$ in combination with triethyl-aluminium, the $TiCl_3$ having been prepared by a reduction of $TiCl_4$ with $H_2$, and furthermore, there is an undesired loss of time for initiating the reaction.

If for the preparation of $TiCl_3$ use is made of the process of reacting $TiCl_4$ with organo-aluminium compounds, which process can be performed more easily from the technical point of view, catalysts are normally obtained which have only a minor selective effect in the olefin polymerization (cf. Natta, literature as mentioned above).

British Pat. No. 895,595 has described a process, according to which the selectivity of such catalysts is considerably increased by subjecting the reaction product of $TiCl_4$ and of organo-aluminium compounds to a thermal treatment at a temperature of from 40 to 150° C., and optionally, by washing it after the treatment several times with an inert solvent. This washed, tempered catalyst is then activated in the course of the olefin polymerization by means of fresh diethylaluminium monochloride. The efficiency of these tempered catalysts can also be varied by carrying out the thermal treatment in the presence of complex or double salt forming substances, such as sodium chloride and ethers.

British Pat. No. 960,232 furthermore describes a process for the preparation of high molecular weight olefin polymers having a high powder apparent density. By way of combining the following measures and conditions of a process for preparing the catalyst containing $TiCl_3$, polymers having a high powder apparent density are obtained:

(a) addition of the halogen-containing organo-aluminium compound to the TiCl
(b) molar ratio Ti:Al less than 1.5
(c) reaction temperature from 0° to 20° C.
(d) concentration of the reactants of from 14 to 60% by weight in an inert dispersion medium
(e) thorough stirring.

The nature of the activation component is a decisive factor in the process of polymerization. By means of aluminiumethyl sesquinchloride, an equimolar mixture of diethylaluminium monochloride and monoethylaluminium dichloride, only a minor polymerization rate is obtained. The reason for this fact is obviously to be seen in the presence of the monoethylaluminium dichloride inhibiting the process of polymerization. An already increased activity of the catalyst can be observed in the activation of the polymerization by means of diethylaluminium monochloride. It can also be noted that the use of this compound leads almost exclusively to isotactic polymers. The catalysts obtained according to the British patents indicated above are more active, in their combination with diethylaluminium monochloride, then the catalyst combination mentioned by Natta consisting of $TiCl_3$ prepared from inorganic starting substances and triethylaluminium.

An even higher reaction rate is obtained, if the $TiCl_3$-containing catalyst prepared according to the British patents indicated above is activated with triethyl aluminium. However, a catalyst of this kind has the decisive drawback that its selectivity is strongly reduced with respect to the formation of insoluble products.

A high polymerization activity means for a technical process the advantage that a small amount of catalyst may be used. As the catalyst residues have to be eliminated from the ready polymer by way of an expensive process, it is very important to keep the amount of catalyst used at at level which is as low as possible. A process yielding almost exclusively isotactic polymers, with a high polymerization activity, is therefore desirable from the technical point of view.

It has now been found that a high polymerization activity can be obtained, together with an excellent stereo-specificity (isotactic proportion >90%), if in the process of the α-olefin polymerization use is made of a titanium trichloride-containing catalyst which is treated with a small amount of diethylaluminium monochloride and subsequently with a small amount of an alkali chloride.

The present invention provides a process for the polymerization of α-olefins of the general formula $CH_2=CHR$, in which R represents an aliphatic hydrocarbon chain having from 1 to 8 carbon atoms, which is unsubstituted or substituted by alkyl radicals, preferably propylene, butene-(1), pentene-(1), 3-methylbutene-(1), 4-methylpentene-(1), 3-methylpentene-(1), and of mixtures of these α-olefins among each other, with or without ethylene, the content of one of the α-olefins in the mixture being at least 95% by weight, as well as a process for the block copolymerization of these α-olefins, with or without ethylene, the ethylene content being up to 25% by weight, in suspension, while using a catalyst system consisting of 3 components, component A—the solid titanium-containing reaction product obtained by the reaction of titanium tetrachloride with diethylaluminium monochloride or ethylaluminium sesquichloride in an inert hydrocarbon as solvent, at a temperature in the range of from −20 to +20° C., and with a molar ratio of diethylaluminium monochloride to titanium tetrachloride of from 0.6 to 1.5, preferably from 0.8 to 1.1, the organo-aluminium compound being added to the $TiCl_4$, the soluble reaction products being separated, whereas the solid reaction product is washed with a solvent and is subsequently subjected to a thermal treatment at a temperature in the range of from 60 to 150° C., component B—diethylaluminium monochloride, component C—alkali chlorides, optionally with regulation of the molar weight with hydrogen at from 20 to 75° C., under a pressure of less than 50 atmospheres gage, preferably less than 25 atmospheres gage, which comprises subjecting the solid titanium-containing reaction product (component A) in the absence of the monomers, prior to the addition of the alkali chloride, preferably sodium chloride and potassium chloride (component C), to a preliminary treatment with diethylaluminium monochloride (component B).

The polymerization of the α-olefins of the general formula $CH_2=CHR$, wherein R represents an aliphatic hydrocarbon chain having from 1 to 8 carbon atoms and being unsubstituted or substituted by alkyl radicals, preferably propylene, butene-(1), pentene-(1), 3-methylbutene-(1), 4-methyl-pentene-(1), 3-methylpentene-(1), may be carried out in suspension continuously and discontinuously, at a pressure of less than 50 atmospheres gage, preferably less than 25 atmospheres gage. Besides for the homopolymerization, the process of the invention is suitable for the polymerization of mixtures of these olefins among each other, with or without ethylene, the content of one of the α-olefins in the mixture being at least 95% by weight. There are to be mentioned, above all, mixtures of propylene with a small amount of ethylene, the ethylene content being 2 to 3% by weight. Furthermore, the process of the invention is suitable for the block copolymerization of these α-olefins, with or without ethylene, preferably for the preparation of block copolymers from propylene and ethylene, the content of polyethylene units being less than 25% by weight. These block copolymers are marked by a great hardness and an excellent impact strength at temperatures of less than 0° C.

The suspension polymerization is carried out in inert solvents, such as mineral oil fractions having a low olefin content and having a boiling range of from 60 to 250° C., and being freed thoroughly from oxygen, sulfur compounds and moisture, as well as saturated aliphatic and cycloaliphatic hydrocarbons, such as butane, pentane, hexane, heptane, cyclohexane, methyl-cyclohexane, and aromatic compounds, such as benzene, toluene and xylene. The suspension polymerization may also preferably be carried out while using the α-olefin to be polymerized as dispersion medium.

The molecular weight is regulated by means of hydrogen. The polymerization temperature should be in the range of from 20 to 75° C., preferably from 50 to 70° C.; higher temperatures promote the formation of the undesired atactic proportion. The amount of catalyst component A containing titanium trichloride depends on the reaction conditions, particularly pressure and temperature. It is in the range of from 0.05 to 10 millimoles of titanium per liter of dispersion medium, preferably from 0.5 to 5 millimoles per liter of dispersion medium.

The polymerization process of the invention is limited to the use of a titanium trichloride-containing catalyst (component A), which is obtained by reacting titanium tetrachloride with diethylaluminium monochloride or ethylaluminium sesquichloride under reaction conditions as are described in British Pats. Nos. 895,595 and 960,232. The reaction of titanium tetrachloride with the halogen-containing organo-aluminium compound is effected in an inert hydrocarbon as solvent (for example, a petrol fraction having a boiling range of from 130 to 170° C.), at a temperature of from −20° C. to +20° C., preferably from 0° to 5° C., by adding the organo-aluminium compound to the titanium tetrachloride.

The concentration of the organo-aluminium compound in the hydrocarbon should be from 18 to 25% by weight and that of the titanium tetrachloride should be from 40 to 60% by weight. The molar ratio of diethylaluminium monochloride to titanium tetrachloride should be from 0.6 to 1.5, preferably from 0.8 to 1.1. If use is made of ethylaluminum sesquichloride, an equimolar mixture of diethylaluminium monochloride and monoethylaluminium dichloride, only the molar ratio of the former to titanium tetrachloride is decisive. The solid reaction product being formed is separated from the reaction product soluble in the hydrocarbon, is then washed with a solvent and subjected to a thermal treatment at a temperature in the range of from 60 to 150° C., and is optionally washed once more. For further treatment, according to the process of the invention, with component B (diethylaluminium monochloride) and component C (alkali chloride), the titanium trichloride-containing catalyst is used in the form of a suspension in the inert hydrocarbon.

According to the process of the invention, the titanium trichloride-containing catalyst treated with diethylaluminium monochloride (component B) and alkali chloride (component C), in the absence of the monomer, is activated in the polymerization of α-olefins with diethylaluminium monochloride (component B). The molar ratio of the organo-aluminium compound (component B) to the titanium trichloride-containing catalyst should be more than 1, preferably from 1.5 to 5, in the course of the activation of the polymerization.

In accordance with the process of the invention, the diethylaluminium monochloride (component B) has a triple function:

(a) reduction of the titanium tetrachloride in the preparation of component A, the diethylaluminium monochloride optionally also being used as a constituent of the ethylaluminium sesquichloride;
(b) preliminary treatment of component A prior to adding the alkali chloride in the absence of the monomer;
(c) activation of the polymer reaction in the presence of the monomer.

Of the alkali chlorides, sodium chloride and potassium chloride are preferably used in the process of the invention. The salts must be dry. Their particle size may be within the wide range of from 1 to $1000\mu$, preferably from 30 to $400\mu$.

The preliminary treatment of the titanium trichloride-containing catalyst (component A) with diethylaluminium monochloride (component B), prior to adding the alkali chloride (component C), is important for the process of the invention. If the alkali chloride is added to the titanium trichloride-containing catalyst directly, a higher proportion of the undesired atactic polymer is obtained. The treatment of component A prior to adding the alkali chloride is effected with only a small amount of diethylaluminium monochloride. The molar ratio of component B to component A should not exceed the narrow range of from 0.1 to 0.5, preferably from 0.2 to 0.3, to 1, in this phase of catalyst preparation. The preliminary treatment is effected at a temperature of from 20° C. to a maximum of 50° C. for a period of from 10 to 300 minutes. Higher temperatures, longer treatment periods, and a greater amount of diethylaluminium monochloride promote the formation of atactic polymer. Following the treatment of the titanium trichloride-containing catalyst with diethylaluminium monochloride, the alkali chloride (component C) is added according to the invention. An essential characteristic of the process of the invention is the fact that only a small amount of alkali chloride is added. The molar ratio of component C to component A should be in the range of from 0.1 to 0.5 to 1, preferably from 0.2 to 0.3 to 1, according to the invention. The treatment with the alkali chloride is advantageously effected at a temperature of from 20 to 50° C. for a period of from 10 to 30 minutes.

The two-step treatment of component A with component B and component C is effected in an inert atmosphere according to the invention in the absence of the monomer to be polymerized.

It was a surprising fact which could not have been foreseen that a two-step treatment of a titanium trichloride-containing catalyst (component A) prepared under special reaction conditions with diethylaluminium monochloride (component B) in the first step and with alkali chloride (component C) in the second step, the order being of decisive importance, leads to a significant increase of the reaction rate in the polymerization of $\alpha$-olefins, without any deterioration of the stereospecificity.

The catalyst used according to the process of the invention has remarkable advantages as compared against the catalysts used in British Pats. Nos. 805,595 and 960,232. There are both a higher catalyst activity and an improved stereospecificity with the same polymerization temperature and the same pressure. Owing to the improved catalyst activity, a minor catalyst concentration may be used for polymerization—to obtain the same space-time yields—which considerably facilitates the complicated working-up, or by means of which the same working-up leads to a better ash removal. Due to the increased stereospecificity, the process of the invention gives poly-$\alpha$-olefins having an increased hardness and stiffness.

Another essential advantage of the process of the invention is to be seen in the fact that the polymerization may be carried out at a higher temperature than with the comparative process, if the same atactic proportion is to be obtained. On one hand, this leads to operational advantages caused by the easier heat removal, for example, the polymerization can be carried out with an increased space-time yield by means of the same cooling surface. On the other hand, this increase of temperature results in a greater catalyst activity, so that the above-mentioned advantages become even more evident.

The following examples serve to illustrate the invention.

EXAMPLE 1

(A) Preparation of the titanium trichloride-containing catalyst component A 1090 ml. of a hydrogenated oxygen-free petrol fraction (boiling range 140 to 165° C.) and 550 ml. of titanium tetrachloride (5 moles) were placed into a stirring vessel having a capacity of 10 liters, with the exclusion of air and moisture, and at a temperature of 0° C. a solution of 1111.2 g. of ethylaluminium sesquichloride (containing 4.5 moles of diethylaluminium monochloride) in 3334 g. of the said petrol fraction was added dropwise within 8 hours, while stirring (250 r.p.m.), under a nitrogen atmosphere. A fine red-brown deposit precipitated. Subsequently, the mixture was stirred for 2 hours at 0° C. and afterwards for 12 hours at room temperature.

The suspension was then heated for 4 hours at 95° C., while stirring. After cooling, the supernatant mother liquor was decanted from the precipitated titanium trichloride-containing catalyst, which was washed twice with 2000 ml. each of the petrol fraction, and was then tempered for another 10 hours at 110° C. The mother liquor was decanted once more, and the solid catalyst was mixed with 5000 ml. of the said petrol fraction. The content of trivalent titanium in the suspension was determined by means of a Ce(IV) solution.

(B) Two-step treatment of the titanium trichloride-containing catalyst component A with diethylaluminium monochloride (component B) and alkali chloride (component C)

250 ml. of the titanium trichloride-containing catalyst suspension prepared according to (A) containing 250 millimoles of $Ti^{III}$ was placed into a stirring vessel having a capacity of 1 liter, with the exclusion of air and moisture; subsequently a solution of 6.29 g. of diethylaluminium monochloride (50 millimoles) in 19.8 g. of the petrol fraction was added dropwise within 10 minutes at room temperature, and the reaction mixture was then stirred for 1 hour at room temperature. Afterwards 50 millimoles of dry sodium chloride (=2.92 g.) were added within 1 minute, while stirring. In the course of this process, an increase in temperature of about 1° C. could be observed. Subsequently, the reaction mixture was stirred for another hour at room temperature (molar ratio Ti:Al:NaCl=1:0.2:0.2)

(C) Polymerization of propylene at normal pressure 1 liter of a hydrogenated oxygen-free petrol fraction (boiling range 140 to 165° C.) was introduced, with the exclusion of air and moisture, into a stirring vessel having a capacity of 2 liters and being provided with a thermometer and a gas inlet tube. The petrol fraction was scavenged with pure nitrogen and was then saturated, at 50° C., with propylene containing about 0.05% by weight of hydrogen. Subsequently, 10 millimoles of diethylaluminium monochloride (=1.21 milliliters) and 5 millimoles of the $TiCl_3$-containing catalyst prepared according to (A) and treated according to (B) were added. The polymerization started after a few minutes. The polymer precipitated in the form of a fine deposit. The temperature was maintained at 50° C. by cooling. Propylene was introduced in such an amount, together with 0.05% by weight of hydrogen, as was converted into the polymer by means of the catalyst system. After 5 hours the polymerization was stopped by adding 50 ml. of isopropanol, the reaction mixture was stirred for 1 hour at 60° C., was then extracted with warm water and filtered with suction, while hot. After thorough washing with a hot solvent (petrol) as well as with acetone, and drying in vacuo at 70° C., 106 g. of colorless polypropylene were obtained. The polymer had an apparent density of 485 g./l. and a reduced specific viscosity, measured at 135° C. in a 0.1% solution in decahydro-naphthalene, of 2.8 dl./g. The ball indentation hardness was 905 kp./cm.$^2$ (DIN 53,456) (German Industrial Standard).

In order to determine the soluble proportion (atactic polypropylene) formed in the polymerization, the insoluble polypropylene was first extracted for 24 hours with boiling heptane, in which process 0.7% were extracted, and in the second phase the mother lye of the polymer suspension and the washing solutions were evaporated in vacuo for drying. A residue of 1.5 g. was obtained (=1.4%, calculated on the total polymer), i.e. 2.1% of soluble proportion were obtained as a total.

EXAMPLE 2

Propylene polymerization at normal pressure

The propylene polymerization was carried out using 5 millimoles of the titanium trichloride-containing catalyst prepared according to Example 1(A) and treated in accordance with the invention, as has been described in Example 1(B), under the conditions of polymerization according to Example 1(C), however at a polymerization temperature of 58° C. 135 g. of solid colorless polypropylene were obtained having a reduced specific viscosity of 2.1 dl./g., an apparent density of 480 g./l., and a ball indentation hardness of 880 kp./cm.$^2$. The soluble proportion in the mother lye was 1.9%. Upon extracting the solid polypropylene with heptane, 1.1% of extractible proportion was found.

EXAMPLE 3

Propylene polymerization at normal pressure

The propylene polymerization was repeated in the way described in Example 1(C), at a polymerization temperature of 70° C. After the working-up, 182 g. of solid polypropylene were obtained (reduced specific viscosity=1.7 dl./g., apparent density 490 g./l., ball indentation hardness 860 kp./cm.$^2$).

A soluble proportion of 2.6% was determined in the mother lye; the proportion extractible from the insoluble polypropylene was 2.0%.

COMPARATIVE EXPERIMENT 1

In a comparative experiment, in which the titanium trichloride-containing catalyst prepared according to Example 1(A) was not subjected to the two-step treatment of the invention by means of diethylaluminium monochloride and sodium chloride according to Example 1(B), a yield of polypropylene insoluble in the dispersion medium of 110 g. was obtained (reduced specific viscosity 2.0 dl./g., apparent density 482 g./l., ball indentation hardness 830 kp./cm.$^2$), under the conditions of polymerization indicated in Example 1(C), at a polymerization temperature of 58° C. When the soluble and/or extractible proportion was determined, as has been indicated in Example 1(C), asoluble proportion of 3.9% was found altogether (2.3% in the mother lye, 1.6% by extraction).

COMPARATIVE EXPERIMENT 2

Propylene polymerization at normal pressure

The polymerization was carried out while using the TiCl$_3$-containing catalyst prepared according to Example 1(A), however, which was not subjected to the treatment according to Example 1(B), in accordance with the conditions of polymerization indicated in Example 1(C), at a polymerization temperature of 70° C. After the working-up, 160 g. of solid colorless polypropylene were obtained (reduced specific viscosity 1.8 dl./g., apparent density 470 g./l., ball indentation hardness 800 kp./cm.$^2$).

A soluble proportion of 4.0% was determined in the mother lye; the proportion extractible from the insoluble polypropylene was 2.7%.

COMPARATIVE EXPERIMENT 3

Propylene polymerization at normal pressure

In another comparative experiment the two-step treatment according to the invention of the titanium trichloride-containing catalyst component A by means of diethylaluminum monochloride and sodium chloride, in the absence of the monomer (propylene) according to Example 1(B), was modified in a way that in the first step the treatment with sodium chloride, and in the second step the treatment with diethylaluminium monochloride were effected. The yield of the propylene polymerization according to Example 1(C), at a polymerization temperature of 58° C. (reduced specific viscosity 2.2 dl./g., apparent density 450 g./l., ball indentation hardness 810 kp./cm.$^2$ (DIN 53, 456)), was in this case 108 g. of colorless polymer. The proportion which was extractible with heptane was 2.1%, and in the mother lye there was a soluble proportion of 3.0%, the soluble proportion thus totalling 5.1%.

COMPARATIVE EXPERIMENT 4

(A) One-step treatment of the titanium trichloride-containing catalyst component A prepared according to Example 1(A) with sodium chloride (component C)

125 ml. of the titanium trichloride-containing catalyst suspension prepared according to Example 1(A) and containing 125 millimoles of Ti$^{III}$ were placed into a stirring vessel having a capacity of 0.5 liter, with the exclusion of air and moisture, and subsequently 25 millimoles of dry sodium chloride (=1.46 g.) were added within 1 minute, while stirring. The reaction mixture was then stirred for 1 hour at room temperature (molar ratio Ti:NaCl=1:0.2).

(B) Propylene polymerization at normal pressure

The polymerization of the propylene was carried out while using the titanium trichloride-containing catalyst prepared according to (A), under the conditions indicated in Example 1(C), at a polymerization temperature of 58° C.

After the working-up, 104 g. of solid polypropylene were obtained (reduced specific viscosity=1.9 dl./g., apparent density 455 g./l., ball indentation hardness 805 kp./cm.$^2$).

In the mother lye, a soluble proportion of 3.4% was determined, and the proportion extractible from the solid polypropylene was 2.2%.

COMPARATIVE EXPERIMENT 5

(A) One-step treatment of the titanium trichloride-containing catalyst component A prepared according to Example 1(A) with diethylaluminium monochloride (component B)

125 ml. of the titanium trichloride-containing catalyst suspension prepared according to Example 1(A) and containing 125 millimoles of Ti$^{III}$ were placed into a stirring vessel having a capacity of 0.5 liter, with the exclusion of air and moisture, and a solution of 3.15 g. of diethylaluminium monochloride (25 millimoles) in 9.9 g. of the petrol fraction was added dropwise, while stirring, within 5 minutes at room temperature; subsequently the reaction mixture was stirred for 1 hour at room temperature (molar ratio Ti:Al=1:0.2).

(B) The polymerization of the propylene with the titanium trichloride-containing catalyst prepared according to (A) was carried out under the conditions indicated in Example 1(C), at a polymerization temperature of 58° C. After the working-up, 115 g. of solid polypropylene were obtained (reduced specific viscosity 2.2 dl./g., apparent density 470 g./l., ball indentation hardness 825 kp./cm.²). In the mother lye, a soluble proportion of 2.5% was determined; the proportion extractible from the solid polypropylene was 2.3%.

The test results obtained with the propylene polymerization of Examples 1 to 3 and the Comparative Experiments 1 to 5 have been listed in the following Table 1.

[addition of 0.05% by weight of an emulsifying agent (ethoxylated stearic acid)]. After filtration of the aqueous suspension and drying in vacuo, 28.7 kg. of colorless polypropylene were obtained (reduced specific viscosity 3.0 dl./g., apparent density 450 g./l., ball indentation hardness 850 kp./cm.²). This corresponded to a catalyst yield of 205 g. of polypropylene per 1 millimole of titanium.

TABLE 1.—PROPYLENE POLYMERIZATION AT NORMAL PRESSURE (2 LITERS OF DISPERSION MEDIUM, 5 mm. OF Ti-CONTAINING CATALYST, 10 mm. OF Al(C₂H₅)₂Cl, 5 HOURS

| | Treatment of the TiCl₃-containing catalyst prepared according to Example 1A | Polymerization temperature | Yield of insoluble polypropylene in g. | Soluble proportion in the mother lye in percent | Extractible proportion in percent | Total soluble proportion in percent | Reduced specific viscosity (dl./g.) | Apparent density (g./l.) | Ball indentation hardness (kp./cm.²) |
|---|---|---|---|---|---|---|---|---|---|
| Example 1C | Yes | 50 | 106 | 1.4 | 0.7 | 2.1 | 2.8 | 485 | 905 |
| Example 2 | Yes | 58 | 135 | 1.9 | 1.1 | 3.0 | 2.1 | 480 | 880 |
| Example 3 | Yes | 70 | 182 | 2.6 | 2.0 | 4.6 | 1.7 | 490 | 860 |
| Comparative Experiment 1 | No treatment | 58 | 110 | 2.3 | 1.6 | 3.9 | 2.0 | 482 | 830 |
| Comparative Experiment 2 | do | 70 | 160 | 4.0 | 2.7 | 6.7 | 1.8 | 470 | 800 |
| Comparative Experiment 3 | No ¹ | 58 | 108 | 3.0 | 2.1 | 5.1 | 2.1 | 450 | 810 |
| Comparative Experiment 4B | No ² | 58 | 104 | 3.4 | 2.2 | 5.6 | 1.9 | 455 | 805 |
| Comparative Experiment 5B | No ³ | 58 | 115 | 2.5 | 2.3 | 4.8 | 2.2 | 470 | 825 |

¹ The TiCl₃-containing catalyst was in the 1st step treated with NaCl and then with Al(C₂H₅)₂Cl.
² The TiCl₃-containing catalyst was treated with component C (NaCl) only.
³ The TiCl₃-containing catalyst was treated with component B (Al(C₂H₅)₂Cl) only.

EXAMPLE 4

(A) Two-step treatment of the titanium trichloride-containing catalyst component with diethylaluminium monochloride (component B) and potassium chloride (component C)

The two-step treatment was carried out under the same conditions as indicated in Example 1(B), however, instead of 50 millimoles of sodium chloride, 50 millimoles of potassium chloride (=3.73 g.) were used (Ti:Al:KCl =1:0.2:0.2).

(B) Propylene polymerization at normal pressure

The polymerization of the propylene was effected while using the titanium trichloride-containing catalyst prepared under 4(A), under the conditions indicated in Example 1(C), at a polymerization temperature of 70° C. After the working-up, 183 g. of solid polypropylene were obtained (reduced specific viscosity 2.0 dl./g., apparent density 450 g./l., ball indentation hardness 850 kp./cm.²). In the mother lye, a soluble proportion of 2.4% was determined; the proportion extractible from the solid polypropylene was 2.2%.

EXAMPLE 5

Propylene polymerization under pressure 70 liters of the hydrogenated oxygen-free petrol fraction having a boiling range of from 140 to 165° C. were placed into an enamel boiler of a capacity of 150 liters pre-heated at 60° C., which was provided with stirrer, jacket heating and gas inlet tube, with complete exclusion of atmospheric oxygen and moisture; the petrol fraction was saturated with propylene, subsequently, a solution of 84.5 g. of diethylaluminium monochloride (=700 millimoles) in 253.5 g. of the said petrol fraction was added under a nitrogen atmosphere.

After stirring the reaction mixture for 10 minutes, 140 millimoles (=140 ml.) of the titanium trichloride-containing catalyst suspension prepared according to Example 1(A) and treated according to Example 1(B) were added. The polymerization started after a few minutes. After a rapid build-up of a pressure of 1.5 atmosphere gage (15 minutes), propylene containing 0.15% by volume of hydrogen was introduced in such an amount that this pressure was maintained at a constant level. The polymerization temperature was brought to 65° C. by cooling. After a polymerization period of 12 hours, the polymerization was stopped by adding 1.4 liter of isopropanol. The reaction mixture was stirred for 2 hours at 60° C., was then stirred three times with 30 liters of water for 30 minutes each, afterwards the aqueous layer was separated. After filtration, the solid material was subjected to a steam distillation for 12 hours The soluble proportion in the mother lye and the proportion extractible from the solid insoluble polypropylene were determined according to the method indicated in Example 1(C). The soluble proportion in the mother lye was 3.0% by weight. By way of extraction, 1.3% were obtained, so that the total soluble proportion amounted to 4.3% by weight.

In a comparative experiment, propylene was polymerized under the same conditions, while using the titanium trichloride - containing catalyst prepared according to Example 1(A), however, which had not been treated in accordance with Example 1(B). The catalyst yield was 185 g. of polypropylene per 1 millimole of titanium; the soluble proportion in the mother lye was 3.2% by weight, and the extractible proportion was 3.5% by weight.

EXAMPLE 6

Polymerization of 4-methylpentene-(1)

The polymerization was carried out under the reaction conditions indicated in Example 1(C), at a polymerization temperature of 55° C. Within 3 hours, 200 g. of 4-methylpentene-(1) were added dropwise, and subsequently the reaction mixture was stirred for 2 hours at 55° C. After the working-up, 190 g. of polymer were obtained. In the mother lye, a very small soluble proportion of 0.7% was determined.

What is claimed is:

1. A process for the suspension polymerization of α-olefins of the general formula $CH_2=CHR$, in which R represents an alkyl substituted or unsubstituted aliphatic hydrocarbon chain having from 1 to 8 carbon atoms, and for the polymerization of mixtures of these α-olefins with each other, with or without ethylene, the content of one of the α-olefins in the mixture being at least 95% by weight, and for the block copolymerization of these α-olefins, with or without ethylene, the ethylene content being up to 25% by weight, using a catalyst system consisting essentially of 1 molar part of component A, the solid titanium-containing reaction product obtained by the reaction of titanium tetrachloride with diethylaluminium monochloride or ethylaluminium sesquichloride in an inert hydrocarbon as solvent, at a temperature of from −20 to +20° C., and with an Al-Ti molar ratio of diethylaluminium monochloride to titanium tetrachloride of from 0.6 to 1.5, the organo-aluminium compound being added to the $TiCl_4$, followed by separation of the soluble reaction products, washing of the solid reaction products with a solvent and subsequent thermal treatment of the products at a temperature in the range of from 60 to 150° C., at least 1 molar part of component B, diethylaluminium monochloride, and from 0.1 to 0.5 molar parts of component C, alkali metal chloride, said process being carried out at a temperature of from 20 to 75° C. and under a pressure of less than 50 atmospheres gage, and wherein the solid titanium-containing reaction product (component A) is treated in the absence of monomer in a first step, for a period of from 10 to 300 minutes at a temperature of from 20 to 50° C. with 0.1 to 0.5 molar parts of diethylaluminium monochloride, and in a second step for a period of from 10 to 300 minutes at a temperature of from 20 to 50° C. with 0.1 to 0.5 molar part of an alkali metal chloride.

2. A process as claimed in claim 1, wherein the molar ratio of component B to component A is from 0.2 to 0.3 to 1, in the preliminary treatment in the absence of the monomer.

3. A process as claimed in claim 1, wherein the molar ratio of alkali chloride (component C) to component A is from 0.2 to 0.3 to 1.

4. A process as claimed in claim 1, wherein the molar ratio of diethylaluminum monochloride to the titanium trichloride-containing catalyst in the presence of the monomer is from 1.5 to 5 to 1.

5. A process as claimed in claim 1, which comprises using as component A a reaction product of titanium tetrachloride and diethylaluminium monochloride or ethylaluminium sesquichloride, in the preparation of which a molar ratio of Al to Ti of 0.8 to 1.1 was observed.

6. A process as claimed in claim 1, which comprises carrying out the polymerization at a temperature in the range of from 50 to 70° C.

7. A process as claimed in claim 1, which comprises carrying out the polymerization at a pressure of less than 25 atmospheres gage.

8. A process as claimed in claim 1, wherein as α-olefins there are used for the polymerization propylene, butene-(1), pentene-(1), 3-methylbutene-(1), 4-methylpentene-(1), or 3-methylpentene-(1).

9. A process as claimed in claim 1, which comprises using for the block copolymerization propylene and up to 25% by weight of ethylene.

10. A process as recited in claim 1, wherein the molecular weight of the polymer is regulated by means of hydrogen.

11. A process as recited in claim 1, wherein the alkali metal chloride is sodium chloride.

12. A process as recited in claim 1, wherein the alkali metal chloride is potassium chloride.

References Cited

UNITED STATES PATENTS

| | | | |
|---|---|---|---|
| 2,909,510 | 10/1959 | Thomas | 260—94.9 E |
| 3,639,515 | 2/1972 | Hagemeyer et al. | 260—878 B |

FOREIGN PATENTS 960,232   6/1964   Great Britain.

JAMES A. SEIDLECK, Primary Examiner

E. J. SMITH, Assistant Examiner

U.S. Cl. X.R.

252—429 C; 260—88.2 R, 93.7, 94.9 E